(12) United States Patent
Sherer et al.

(10) Patent No.: US 8,326,967 B2
(45) Date of Patent: Dec. 4, 2012

(54) STREAM CONTROL FAILOVER UTILIZING THE SHARING OF STATE INFORMATION WITHIN A LOGICAL GROUP OF STREAM SERVERS

(75) Inventors: W. Paul Sherer, Danville, CA (US); Kirk Blattman, San Ramon, CA (US); Hoi-Tauw Chou, San Ramon, CA (US); Glenn Connery, Petaluma, CA (US); Howard Davis, Salem, UT (US); Daniel Kiewlich, Alameda, CA (US); Robert Drew Major, Orem, UT (US); Mel Oyler, Pleasant Grove, UT (US); Neeraj K. Sharma, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1016 days.

(21) Appl. No.: 11/394,823

(22) Filed: Mar. 31, 2006

(65) Prior Publication Data

US 2006/0248212 A1 Nov. 2, 2006

Related U.S. Application Data

(60) Provisional application No. 60/667,300, filed on Apr. 1, 2005.

(51) Int. Cl.
*G06F 15/173* (2006.01)
(52) U.S. Cl. ..................................................... 709/224
(58) Field of Classification Search .................. 709/221, 709/203, 227, 224; 725/91
See application file for complete search history.

(56) References Cited

U.S. PATENT DOCUMENTS

| 6,006,264 | A | 12/1999 | Colby et al. |
| 6,195,680 | B1* | 2/2001 | Goldszmidt et al. .......... 709/203 |
| 6,269,394 | B1 | 7/2001 | Kenner et al. |
| 6,449,647 | B1 | 9/2002 | Colby et al. |
| 6,496,856 | B1 | 12/2002 | Kenner et al. |
| 6,625,811 | B1 | 9/2003 | Kaneko |
| 7,257,634 | B2 | 8/2007 | Colby et al. |
| 7,272,657 | B2 | 9/2007 | Allen et al. |
| 7,318,107 | B1* | 1/2008 | Menon .......................... 709/239 |

(Continued)

FOREIGN PATENT DOCUMENTS

| JP | 2002-354451 A | 12/2002 |
| WO | 0249359 A1 | 6/2002 |
| WO | WO 02/49359 | 6/2002 |
| WO | WO 03/049449 A2 | 6/2003 |

OTHER PUBLICATIONS

U.S. Office Action dated Jul. 8, 2009 cited in U.S. Appl. No. 11/395,572, 13 pgs.

(Continued)

*Primary Examiner* — Brian P Whipple
(74) *Attorney, Agent, or Firm* — Merchant & Gould

(57) ABSTRACT

A technique for streaming digital video content to multiple clients involves establishing a logical group of IP-connected stream servers, generating state information at multiple stream servers within the logical group, sharing the state information amongst stream servers in the logical group, and using the shared state information to respond to resource failures within the logical group. By sharing state information within the logical group of stream servers, stream servers with the shared state information can quickly take over the active streams from a failed stream server within the logical group. The quick transition of responsibility from one stream server to another enables the streaming network to provide continuous streaming of digital video content to the viewer without interruption.

11 Claims, 10 Drawing Sheets

U.S. PATENT DOCUMENTS

| | | | |
|---|---|---|---|
| 7,444,662 B2 * | 10/2008 | Faibish et al. | 725/91 |
| 7,516,202 B2 * | 4/2009 | Yu et al. | 709/223 |
| 7,721,117 B2 | 5/2010 | Sherer et al. | |
| 7,752,301 B1 * | 7/2010 | Maiocco et al. | 709/224 |
| 7,831,672 B2 * | 11/2010 | Tsai | 709/206 |
| 8,112,489 B1 * | 2/2012 | Cox et al. | 709/208 |
| 8,200,803 B2 * | 6/2012 | Benfield et al. | 709/223 |
| 2003/0056128 A1 | 3/2003 | Leddige et al. | |
| 2003/0105950 A1 | 6/2003 | Hirano et al. | |
| 2003/0110393 A1 | 6/2003 | Brock et al. | |
| 2004/0010583 A1 * | 1/2004 | Yu et al. | 709/224 |
| 2004/0039820 A1 | 2/2004 | Colby et al. | |
| 2004/0088380 A1 | 5/2004 | Chung et al. | |
| 2006/0153567 A1 | 7/2006 | Kim et al. | |
| 2006/0248213 A1 | 11/2006 | Sherer et al. | |
| 2010/0223394 A1 | 9/2010 | Sherer et al. | |
| 2010/0229096 A1 * | 9/2010 | Maiocco et al. | 715/734 |

OTHER PUBLICATIONS

U.S. Office Action dated Oct. 8, 2010 cited in U.S. Appl. No. 12/780,598, 19 pgs.

U.S. Final Office Action dated Apr. 14, 2011 cited in U.S. Appl. No. 12/780,598, 16 pgs.

U.S. Office Action dated Oct. 24, 2011 cited in U.S. Appl. No. 12/780,598, 22 pgs.

European Supplementary Search Report dated Jul. 14, 2011 cited in Application No. 06 74 9175.3, 15 pgs.

Sonia González et al., "Load Sharing Based on Popularity in Distributed Video on Demand Systems," Multimedia and Expo, IEEE International Conference Proceedings, Aug. 26, 2002, vol. 1, pp. 5-8.

Xiaobo Zhou et al., "Request Redirection and Data Layout for Network Traffic Balancing in Cluster-based Video-on-Demand Servers," Proceedings of the International Parallel and Distributed Processing Symposium, Apr. 15, 2002, pp. 127-134.

Yasuhiko Miyazaki et al., "Dynamic Coordination of Movies According to Popularity Index and Resource Availablity Within a Hierarchical VOD System," IEEE TENCON—Speech and Image Technologies for Computing and Telecommunications, Jan. 1, 1997, pp. 199-202.

U.S. Final Office Action dated Apr. 12, 2012 cited in U.S. Appl. No. 12/780,598, 14 pgs.

Non-Final Office action, mailed Jul. 8, 2009 for U.S. Appl. No. 11/395,572.

* cited by examiner

| Attribute Number of Active Streams | Protection Mechanism |
|---|---|
| 500 + | A |
| 250 - 499 | B |
| 10 - 249 | B |
| 0 - 9 | C,D |

FIG.2

| Attribute Number of Active Streams | Priority |
|---|---|
| 500 + | I |
| 250 - 499 | II |
| 10 - 249 | II |
| 0 - 9 | IV |

FIG.3A

| Priority | Protection Mechanism |
|---|---|
| I | A |
| II | B |
| III | C |
| IV | C,D |

FIG.3B

| Attribute Type of Content Element | Priority |
|---|---|
| program-gold | I |
| program-silver | II |
| program-bronze | III |
| advertisement-gold | I |
| advertisement-silver | II |
| advertisement-bronze | III |
| emergency alert | I |

STREAM CONTROL FAILOVER UTILIZING THE SHARING OF STATE INFORMATION WITHIN A LOGICAL GROUP OF STREAM SERVERS

CROSS-REFERENCE TO RELATED APPLICATIONS

This application is entitled to the benefit of provisional U.S. Patent Application Ser. No. 60/667,300, filed Apr. 1, 2005, the disclosure of which is incorporated by reference herein in its entirety.

This application is related to the co-filed applications entitled "STREAM CONTROL FAILOVER UTILIZING AN ATTRIBUTE-DEPENDENT PROTECTION MECHANISM" having application Ser. No. 11/395,572, filed Mar. 31, 2006.

FIELD OF THE INVENTION

The invention relates generally to digital video networks that stream digital video content to multiple clients, and more particularly, to techniques for stream control failover in such digital video networks.

BACKGROUND OF THE INVENTION

Digital video content can now be streamed to multiple clients in real-time over traditional cable television and telephone networks, both of which are being leveraged by service providers to provide more attractive and varied services to customers. In order for a streaming video service to be commercially successful, it must be able to recover from resource failures that will inevitably occur.

Streaming client software in devices such as set top boxes and PCs, and backoffice stream session control software such as ISA, nAble, and NGOD, typically maintain a static picture of the topology of the elements in a streaming network. Further, elements of the streaming network which implement content vault storage and streaming pump operations are statically configured and administered. Fault tolerance is typically not built into the backoffice and client software subsystems.

In conventional streaming networks, stream servers are continuously generating state information, especially as streams are setup, maintained, and torn down. If a stream server crashes, the state information generated at the stream server can be lost and restarting the stream on a new stream server will result in a perceptible service disruption to a viewer. One technique for providing fault tolerance in a streaming network involves installing a dedicated backup stream server for each active stream server. The active stream server services active streams and sends state information to the backup stream server. The backup stream server does not support any streams, and sits idle in the background receiving state information from the active stream server and waiting for an indication that the active stream server has failed. While installing a dedicated backup stream server for each active stream server works well to provide reliable stream control failover in a streaming network, having a backup stream server sit idle until the active stream server fails is a resource intensive solution.

SUMMARY OF THE INVENTION

A technique for streaming digital video content to multiple clients involves establishing a logical group of IP-connected stream servers, generating state information at multiple stream servers within the logical group, sharing the state information amongst stream servers in the logical group, and using the shared state information to respond to resource failures within the logical group. By sharing state information within the logical group of stream servers, stream servers with the shared state information can quickly take over the active streams from a failed stream server within the logical group. The quick transition of responsibility from one stream server to another enables the streaming network to provide continuous streaming of digital video content to the viewer without interruption. Further, the sharing of state information between stream servers in the logical group allows the stream servers to support active streams while also serving as backup stream servers for the logical group. This avoids the need to have dedicated backup stream servers that sit idle until a resource failure occurs.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 2 depicts an exemplary matrix that correlates the number of active streams of a content element to a particular protection mechanism.

FIG. 3A depicts the mapping of popularity statistics to priority.

FIG. 3B depicts the mapping of priority to protection mechanisms.

Throughout the description, similar reference numbers may be used to identify similar elements.

DETAILED DESCRIPTION OF THE INVENTION

Figure 1:
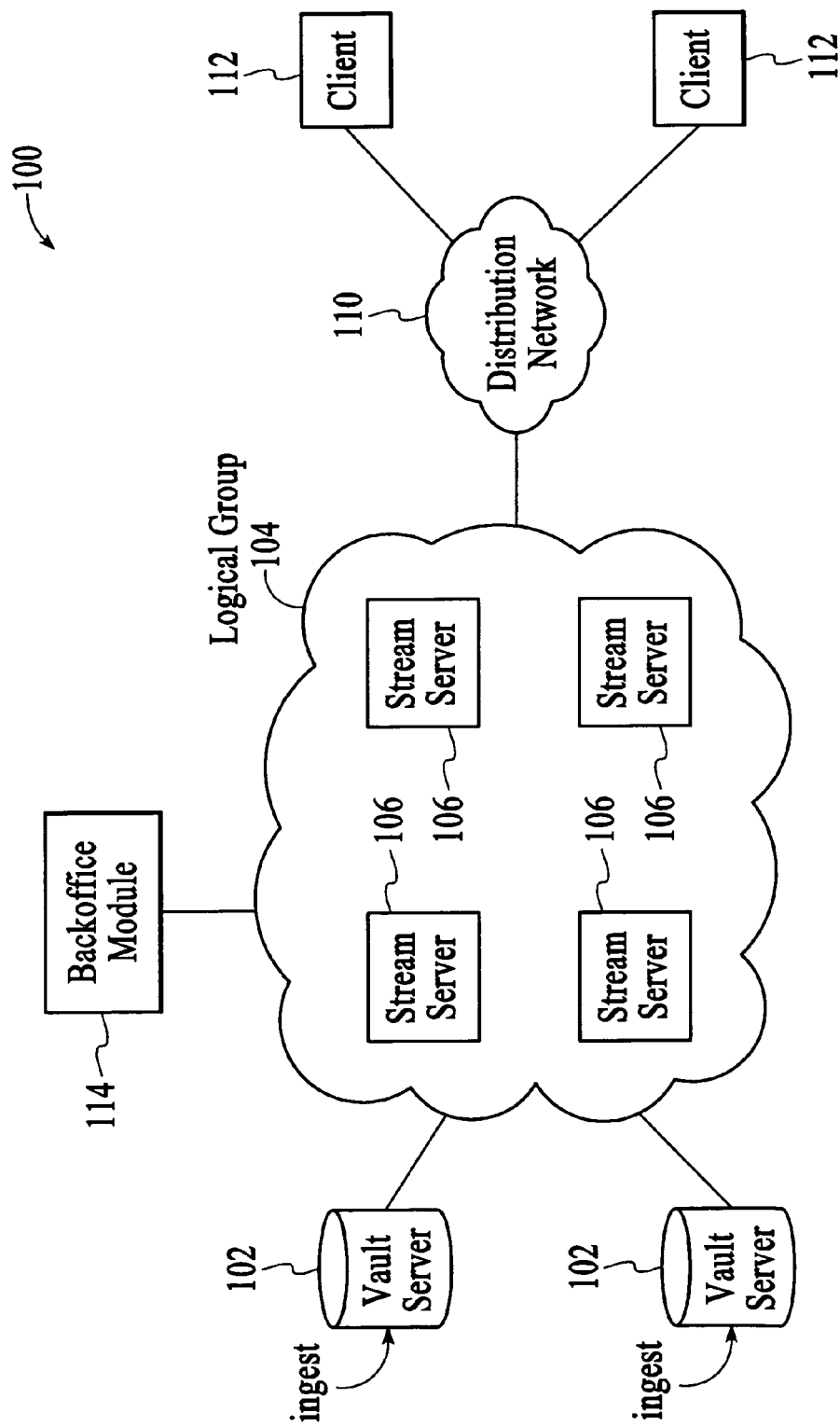
FIG. 1 depicts a network for streaming digital video content to multiple clients.

FIG. 1 depicts a network 100 for streaming digital video content to multiple clients. The network includes vault servers 102, a logical group 104 of stream servers 106, a distribution network 110, clients 112, and a backoffice module 114. The vault servers ingest digital video content from external sources and in the case of live television provide digital video content to the stream servers in real-time. Alternatively, the vault servers may store the ingested digital video content for subsequent delivery to the stream servers, for example, in the case of an application such as movies on demand. Vault servers that support any combination of real-time streaming and storage of digital video content are possible.

The stream servers 106 ingest digital video content from the vault servers 102 and control the streaming of digital video content to the clients 112. The stream servers are combined into a logical group of stream servers that communicate with each other at the Network Layer using, for example, the Internet Protocol (IP). In an embodiment, the logical group is established by associating each stream server that is to be included in the logical group with the same group identifier. The stream servers in the logical group then communicate with the other stream servers in the logical group using, for example, a multicast or broadcast IP messaging protocol. As long as the stream servers can communicate with each other using a communications protocol such as IP, there are few, if any, physical boundaries to the logical group.

The distribution network 110 supports the distribution (e.g., multicasting and unicasting) of digital video content from the stream servers 106 downstream to the clients 112. The distribution network also supports upstream unicast messaging from the clients to the stream servers and the backoffice module 114. The distribution network may utilize any network technology that supports the distribution of digital video content to multiple clients. In a packet-based environment, the distribution network may utilize, for example, routers, switches, DSLAMs, cable modem termination systems (CMTSs), passive optical network (PON) architectures, or any combination thereof. In a hybrid fiber coaxial (HFC) environment, the distribution network may utilize, for example, a combination of routers, switches, and QAMs. The distribution network may also utilize wireless distribution technologies.

The clients 112 are systems that receive the digital video content from the distribution network 110 and provide the digital video content to video display devices (e.g., televisions). The clients may be embodied as hardware, firmware, software, or any combination thereof and are sometimes referred to as set-top boxes (STBs). Clients may also be embodied as personal computers, home entertainment equipment, or integrated into display devices. Clients in general are well-known in the field.

Referring again to FIG. 1, multiple channels of digital video content can be provided to the stream servers 106 from the vault servers 102. In this embodiment, the digital video content that is provided to the stream servers is real-time digital video content received at the vault servers and passed to the stream servers with little or no delay. For example, the digital video content includes real-time content from the content producers and/or distributors. The digital video content may include, for example, live content (e.g., live sporting events, news, etc.) or pre-recorded content that is released by the content producers and/or distributors. In other embodiments, the digital video content may be stored locally by the stream servers or the vault servers. Whether the digital video content is real-time or stored locally, the digital video content is streamed to the clients via the stream servers.

A content element as used herein is any uniquely identifiable digital video content. As an example, a content element may include alone or in combination: a titled content element (e.g., a titled program); a group of titled content elements; a content sub-element (e.g., a portion of a titled program), a channel with which digital video content is associated; an advertisement; a group of advertisements; a group of pictures; a group of frames (e.g., a group of MPEG frames); and a sequence of frames (e.g., a sequence of MPEG frames).

An attribute of a content element as used herein is any identifiable characteristic that is associated with the content element. As an example, attributes of a content element may include alone or in combination: the popularity of a content element (e.g., as measured by the number of active streams, the number of stream setup requests, the rate of receipt of stream setup requests, the number of plays of a content element in a given time period, and/or the number of requests for a particular start point of digital video content); the type of content element (e.g., program content, advertisement content, subscriber communications, emergency alerts); the importance of the content element (highly important, moderately important, least important). Note that a content element may include other attributes that are not described herein and the scope of the attributes is not intended to be limited by the above-identified examples.

In order to provide reliable streaming of digital video content to the clients, it is important to be able to recover from resource failures. Examples of resource failures that may occur in a network that streams digital video content to multiple clients include, but are not limited to: vault server failures; stream server failures; network interface failures; network connection failures; component failures (e.g., disk failure, memory failure).

In the streaming network described with reference to FIG. 1, there are various different protection mechanisms that can be put in place to respond to a resource failure that affects the streaming of digital video content to a client or clients. These protection mechanisms typically involve switching a stream from a failed resource (e.g., a failed stream server) to a resource (e.g., a different stream server) that is able to support the stream. In an embodiment, the amount of resources (e.g., CPU, RAM, disk input/output (I/O), network I/O) that it takes to respond to a resource failure is proportional to the desired speed of recovery. For example, a recovery mechanism that achieves very fast recovery with no disruption of service on the client side is usually more resource intensive than a protection mechanism that achieves a slower recovery and exhibits some disruption of service on the client side.

In accordance with an embodiment of the invention, a technique for managing the streaming of digital video content to multiple clients involves identifying an attribute of a content element that is streamed to a client and selecting a protection mechanism for the content element as a function of the attribute, wherein the protection mechanism enables streaming of the content element to the client in the event of a resource failure. In an example, the identified attribute is an indication of the popularity of the content element (e.g., as measured by the number of active streams), such that the protection mechanism is selected as a function of the popularity of the content element. Typically, the amount of resources needed to provide a protection mechanism is relative to the level of protection provided such that a higher level of protection requires more resources than a lower level of protection. In an embodiment, protection mechanisms that offer a high level of protection are selected for the more popular content elements and protection mechanisms that offer a lower level of protection are selected for the less popular content elements. By intelligently selecting protection mechanisms that correspond to the popularity of content elements, protection resources can be more efficiently utilized, thereby improving the scalability of the network.

As mentioned above, one attribute of a content element that can be used to select a protection mechanism is the popularity of the content element. In an embodiment, the protection mechanism for a particular content element is selected as a function of the current number of active streams. For example, the number of active streams associated with a streamed program is monitored and the protection mechanism for the program is selected as a function of the number of active streams for the program. Applying this approach to multiple programs, the most popular programs can be given higher levels of protection than obscure programs that are much less popular.

FIG. 2 depicts an exemplary matrix 118 that correlates the number of active streams of a content element to a particular protection mechanism. In the matrix, the number of active streams of the content element is broken up into four ranges; 0-9, 10-249, 250-499, and 500 or more. Each range is associated with a particular protection mechanism or mechanisms. As depicted in FIG. 2, the range of 0-9 active streams is associated with protection mechanisms C and D, the ranges of 10-249 and 250-499 active streams are associated with protection mechanism B, and the range of 500 or more active streams is associated with protection mechanism A. In an embodiment, the protection mechanisms are associated with the ranges such that the most popular content elements (e.g., those content elements with the most active streams) are associated with the protection mechanisms that afford the highest level of protection. Typically, the level of protection is a function of the speed with which a stream can be switched from one resource to another (e.g., from a failed stream server to a working stream server). For example, the highest level of protection is provided by a protection mechanism that can switch a stream to a different stream server in the event of a resource failure without any perceptible delay in the played out digital video content and without losing a single frame of the digital video content. Lower levels of protection may involve some amount of perceptible delay and/or frame loss during failover.

The protection mechanisms that are associated with an attribute of a content element can be any protection mechanisms that are available within the network. Additionally, the same protection mechanism can be associated with different attributes, more than one protection mechanism can be associated with an attribute, and the protection mechanisms don't necessarily have to be in order of increasing or decreasing level of protection.

In the embodiment of FIG. 2, the attribute of a content element is directly mapped to a protection mechanism. For example, the range of 10-249 active streams maps directly to protection mechanism B. In another embodiment, the attribute of a content element is indirectly mapped to a protection mechanism. For example, FIG. 3A depicts a matrix 120 mapping popularity statistics to priority and FIG. 3B depicts a matrix 122 mapping of priority to protection mechanisms. The combination of the mappings depicted in FIGS. 3A and 3B creates an indirect mapping between the attribute of popularity and various protection mechanisms. The indirect mapping between an attribute and a protection mechanism provides a level of abstraction that enables the protection mechanism associations to be modified without reprogramming each attribute/protection mechanism relationship. For example, referring to FIG. 3B, a modification of the priority/protection mechanism association for priority II will in turn affect both the 10-249 and the 250-499 active stream ranges depicted in FIG. 3A. Although in FIGS. 3A and 3B, the popularity is mapped to a priority, the priorities could be some other set of categories, which are then mapped to protection mechanisms.

Figures 4, 5:
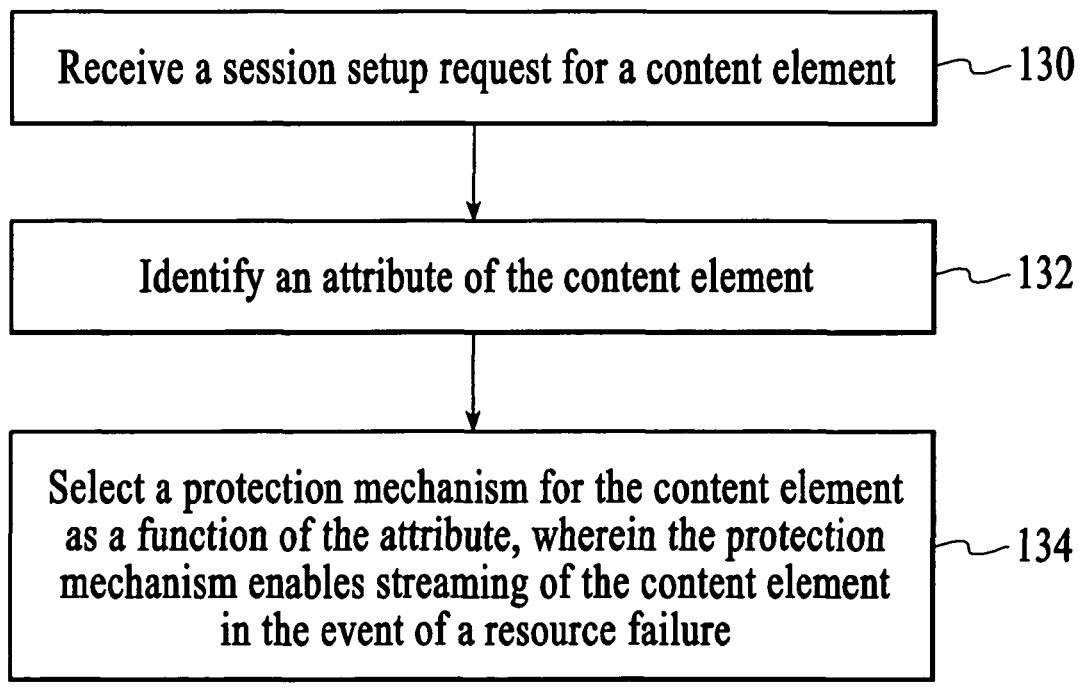
FIG. 4 depicts an exemplary mapping of different types of content elements to priorities.
FIG. 5 depicts a process flow diagram of a technique for managing the streaming of digital video content in the case where the protection mechanism is selected at session setup.

In another embodiment, the attribute of the content elements used to select the protection mechanism is the type of content element rather than the popularity of the content element. FIG. 4 depicts an exemplary matrix 124 mapping different types of content elements to priorities. As indicated in FIG. 4, the types of content elements include program-gold, program-silver, program-bronze, advertisement-gold, advertisement-silver, advertisement-bronze, and emergency alert, where the gold, silver, and bronze designations relate to service levels. The corresponding priorities of the different types of content elements can then be associated with protection mechanisms as described with reference to FIG. 3B.

The selection of a protection mechanism for a content element can take place, for example, at session setup and/or on a continuous basis. FIG. 5 depicts a process flow diagram of a technique for managing the streaming of digital video content in the case where the protection mechanism is selected at session setup. At block 130, a session setup request for a content element is received. At block 132, an attribute of the content element is identified and at block 134, a protection mechanism for the content element is selected as a function of the attribute, wherein the protection mechanism enables streaming of the content element in the event of a resource failure.

Figure 6:
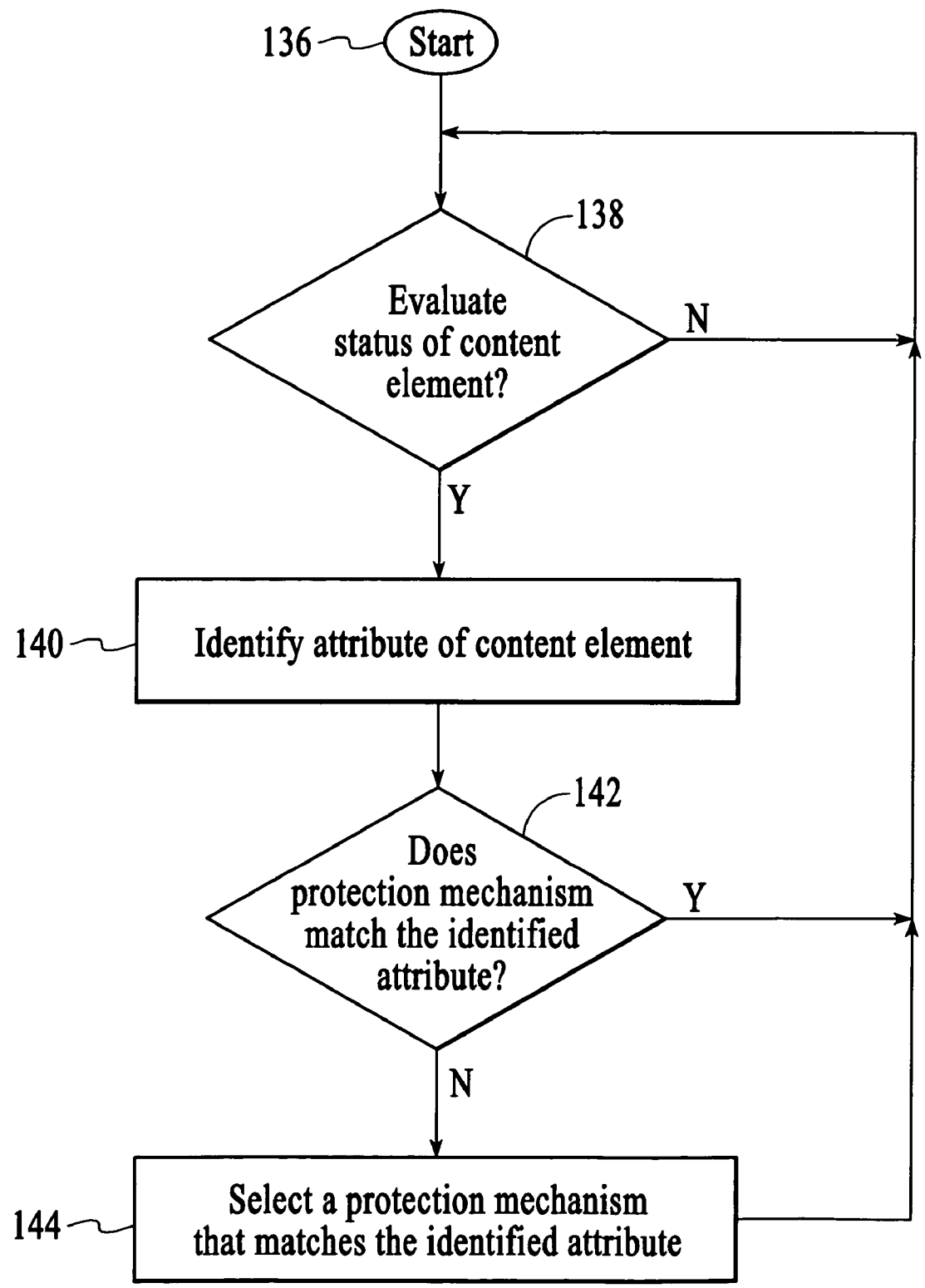
FIG. 6 depicts a process flow diagram of a technique for managing the streaming of digital video content in the case where the protection mechanism for a content element is continuously evaluated.

FIG. 6 depicts a process flow diagram of a technique for managing the streaming of digital video content in the case where the protection mechanism for a content element is continuously evaluated. After and initial start process 136, at decision point 138, it is determined whether or not the status of the content element should be evaluated. In an embodiment, the status of a content element is evaluated on a periodic basis although other triggers are possible. For example, the number of active streams associated with a program or channel can be determined at a regular time interval (e.g., once a minute). If the status of the content element is not to be evaluated, then the process returns to decision point 138. If the decision is to evaluate the status of the content element, then at block 140, an attribute of the content element is identified. For example, if the attribute of the content element is popularity, the current number of active streams associated with the content element is determined. Once the attribute is identified, at decision point 142, it is determined if the protection mechanism matches the identified attribute. For example, it is determined if the protection mechanism that is in place corresponds to the current number of active streams for the particular content element. If the protection mechanism matches the identified attribute, then the protection mechanism remains unchanged and the process returns to decision point 138. On the other hand, if the protection mechanism does not match the identified attribute, then at block 144 a protection mechanism that matches the identified attribute is selected. For example, the protection mechanism can be adjusted to a higher or lower level of protection depending on the current number of active streams for the content element. Once the new protection mechanism is selected, the process returns to decision point 138.

Figure 7:
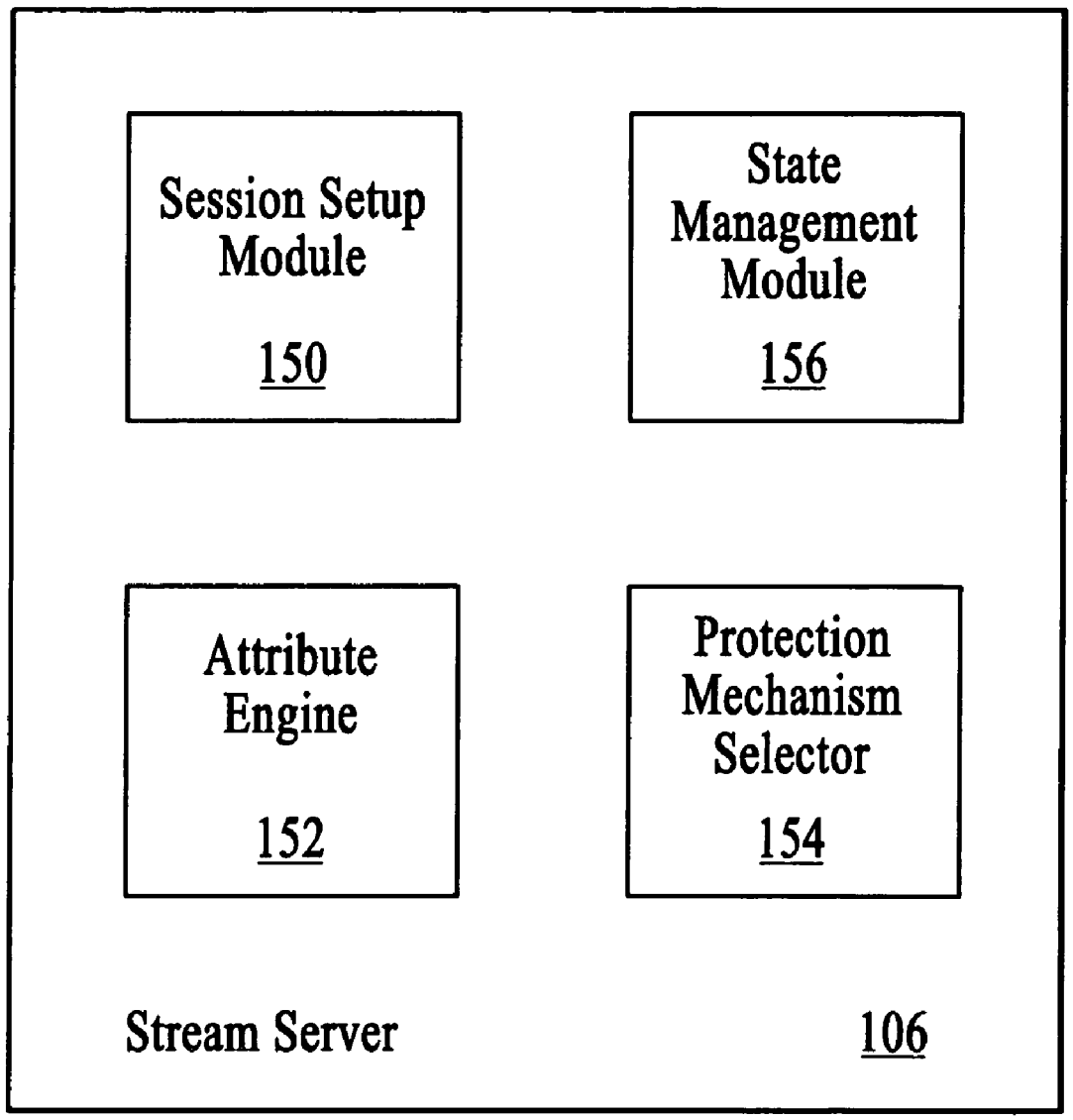
FIG. 7 depicts an expanded view of one of the stream servers from FIG. 1.

FIG. 7 depicts an expanded view of one of the stream servers 106 from FIG. 1. The stream server depicted in FIG. 7 includes a session setup module 150, an attribute engine 152, a protection mechanism selector 154, and a state management module 156. The session setup module processes session setup requests that are received from the backoffice module 114, the clients 112, and/or other stream servers. The session setup module communicates with the protection mechanism selector to identify a protection mechanism for a stream session. In the embodiment of FIG. 7, the attribute engine manages the identification of an attribute that is associated with a content element. For example, if the attribute is the number of active streams, the attribute engine determines how many active streams are associated with the content element. If the attribute is the type of content element, the attribute engine includes an association between content elements and content element types. The protection mechanism selector utilizes information from the attribute engine to select the appropriate protection mechanism for a particular content element. For example, if the attribute is the number of active streams, the protection mechanism selector obtains from the attribute engine the number of active streams for a content element and translates the number of active streams into a protection mechanism as described with reference to FIGS. 2-6.

The selection of the protection mechanism for a particular content element can be made, for example, on a stream-by-stream basis (e.g., for each instance of the content element). For example, different protection mechanisms can be selected for different streams of the same titled content element. This can be used, for example, to provide different qualities of service for different subscription levels.

In an embodiment, the popularity of a content element is determined on a logical group basis. However, in other embodiments, the popularity of a content element can be determined on a stream server-by-stream server basis or a more global basis than the logical group.

Figure 8A:
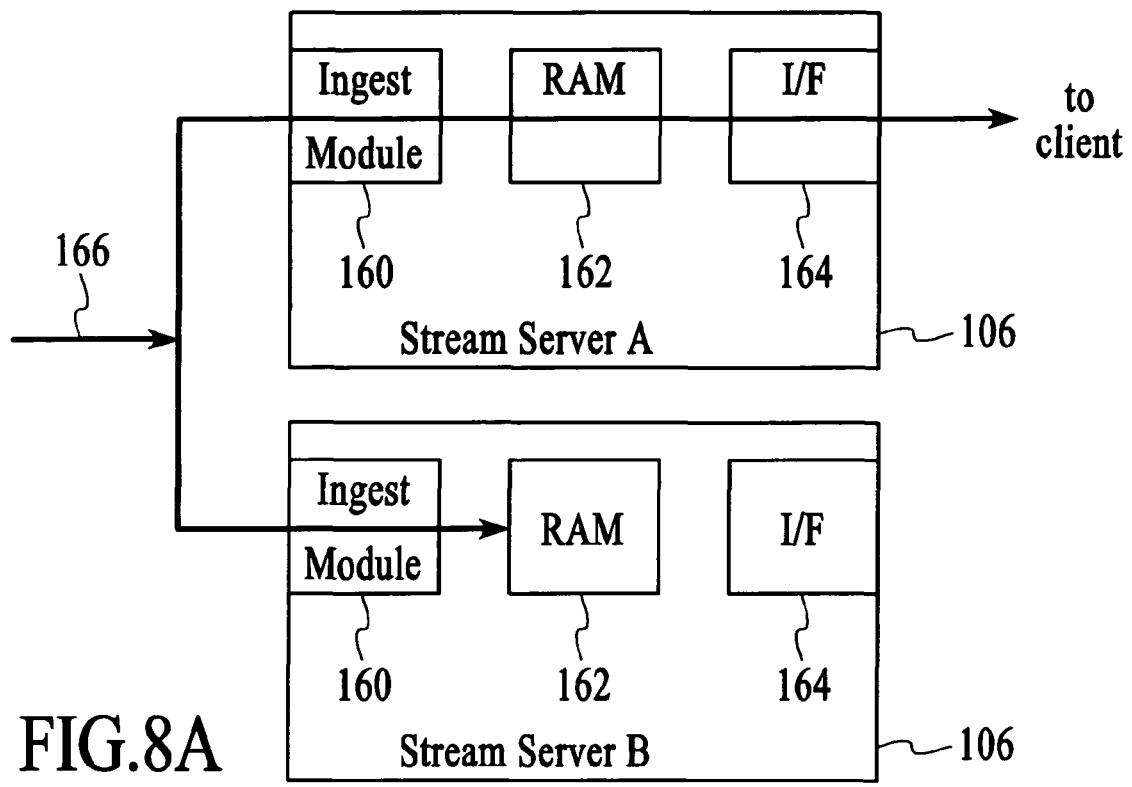
FIGS. 8A and 8B illustrate a protection mechanism that involves playing out the same digital video content to random access memory on two different stream servers and switching the active interface in the event of a resource failure.
Figure 8B:
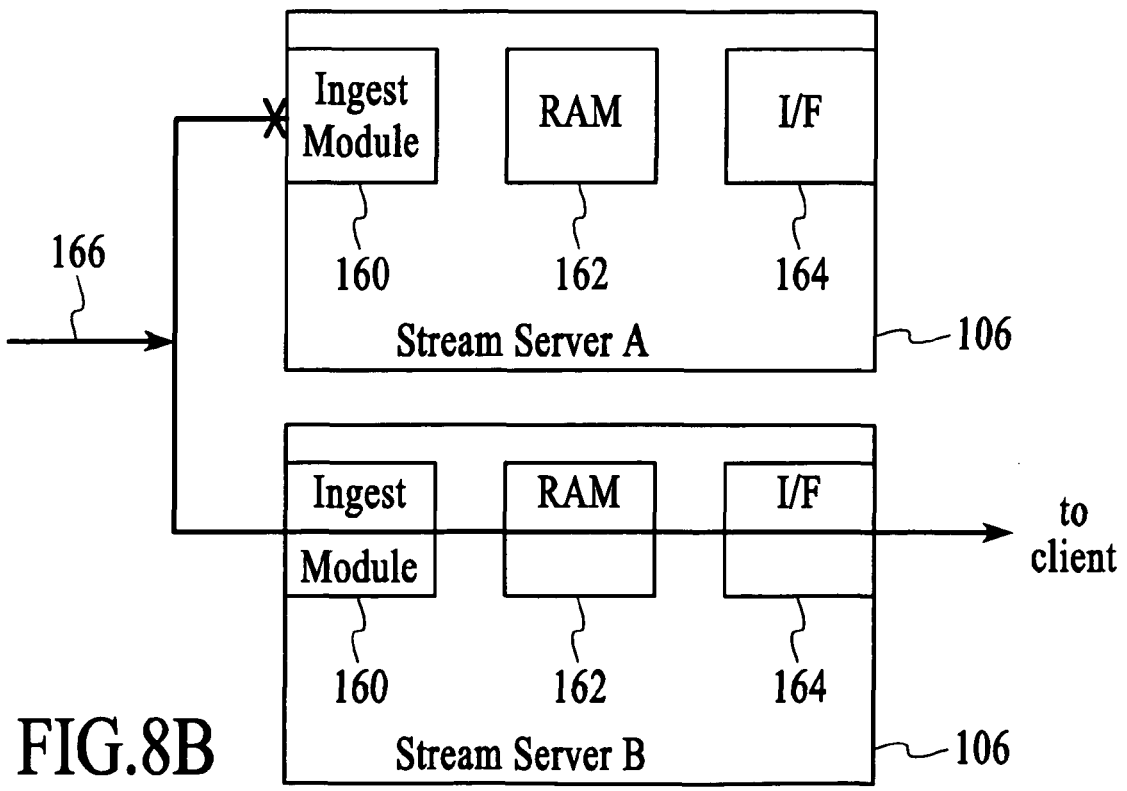

As described above, various different protection mechanisms can be used to recover from a resource failure. In accordance with an embodiment of the invention, a protection mechanism, referred to herein as "hot standby," is described with reference to FIGS. 8A and 8B. Referring to FIG. 8A, two stream servers 106 each include an ingest module 160, random access memory (RAM) 162, and an interface (I/F) 164 that connects the stream servers to the distribution network. According to the hot standby protection mechanism, the same digital video content 166 is provided to both of the stream servers (i.e., to stream servers A and B). Both of the stream servers ingest the digital video content and store the digital video content, at least temporarily, in their respective RAM. As is known in the field, digital video content is typically played out to RAM before it is transmitted onto a network link through an interface. Typically, the RAM stores a small moving window of the digital video content, simultaneously receiving new frames of digital video content and discarding old frames of digital video content such that the amount of digital video content stored in the RAM maintains a steady state. As depicted in FIG. 8A, one of the stream servers (i.e., stream server A) transmits the digital video content that is stored in RAM out its interface to the clients. The other stream server (stream server B) continues to play the digital video content to its RAM but does not activate its interface unless or until a failure is detected in stream server A. If a failure is detected in stream server A, because stream server B has the digital video content played out to its RAM, the stream server can begin transmitting the digital video content by simply activating its interface. FIG. 8B depicts the digital video content being streamed to the client via stream server B instead of stream server A after a failure is detected in stream server A. In an embodiment, the interface of stream server B is activated fast enough that there is no perceptible delay of the displayed digital video content and no dropped frames. Although RAM is described herein as the temporary memory, other types of high speed memory such as Flash memory may be used to temporarily store the digital video content before it is transmitted out the network interface. Additionally, although not shown the stream server typically includes hard disk memory that allows the stream server to locally store, or cache, ingested digital video content.

In an embodiment, protection mechanisms are broken down into three levels. The highest level of protection is achieved by the hot standby technique described above, a middle level of protection is achieved by ensuring that a content element is locally cached at a stream server so that it can be quickly accessed (although not as quickly as hot standby), and a lowest level of protection that does not specify either hot standby or local caching but allows the content element to be stored in any convenient manner.

As described above, one attribute of a content element can be the importance of a content element relative to other content elements. For example, a content element that is associated with an emergency alert may be deemed to be more important than a content element associated with an advertisement. In an embodiment, a protection mechanism that provides a higher level of protection is selected for a more important content element and a protection mechanism that provides a lower level of protection is selected for a less important content element.

In an embodiment, the resource requirements of the different available protection mechanisms are identified. Further, a fault recovery requirement is established for a content element. For example, the fault recovery requirement indicates a maximum acceptable delay and/or frame loss for a content element. With this information available, protection mechanisms are selected by finding the protection mechanism with the lowest resource requirement that still meets the fault recovery requirement for the particular content element. Using this technique, the level of protection provided by a protection mechanism is matched to the particular fault recovery needs of the content element, thereby preventing resource intensive protection mechanisms from being unnecessarily applied to content elements that can be satisfactorily protected by less resource intensive means.

Some streaming networks support trick modes (e.g., rewind, fast rewind, pause, fast forward). In an embodiment, the same protection mechanisms that are applied to the original content elements are applied also to the associated trick mode objects. However, an in alternative embodiment, protection mechanisms are applied to trick mode objects independently of the original content elements. This allows different levels of protection to be applied to a content element and its associated trick mode objects.

In addition to selecting protection mechanisms, other operations can be performed as a function of an attribute of a content element. For example, streams of the same content can be distributed amongst stream servers in a logical group as a function of popularity. In one embodiment, streams of a more popular content element (e.g., a program or a channel) are distributed more widely amongst the stream servers. A relatively wide distribution of streams amongst the stream servers can make it easier and quicker to switch streams from one stream server to another in the event of a resource failure.

In an embodiment, the attribute of a content element is identified in real time and reflective of current network conditions. For example, popularity statistics are dynamically computed based on actual demand for content elements within the logical group of stream servers.

In accordance with another embodiment of the invention, a technique for streaming digital video content to multiple clients involves establishing a logical group of IP-connected stream servers, generating state information at multiple stream servers within the logical group, sharing the state information amongst stream servers in the logical group, and using the shared state information to respond to resource failures within the logical group. By sharing state information within the logical group of stream servers, stream servers with the shared state information can quickly take over the active streams from a failed stream server within the logical group. The quick transition of responsibility from one stream server to another enables the streaming network to provide continuous streaming of digital video content to the viewer without interruption. Further, the sharing of state information between stream servers in the logical group allows the stream servers to support active streams while also serving as backup stream servers for the logical group. This avoids the need to have dedicated backup stream servers that sit idle until a resource failure occurs.

Figure 9:
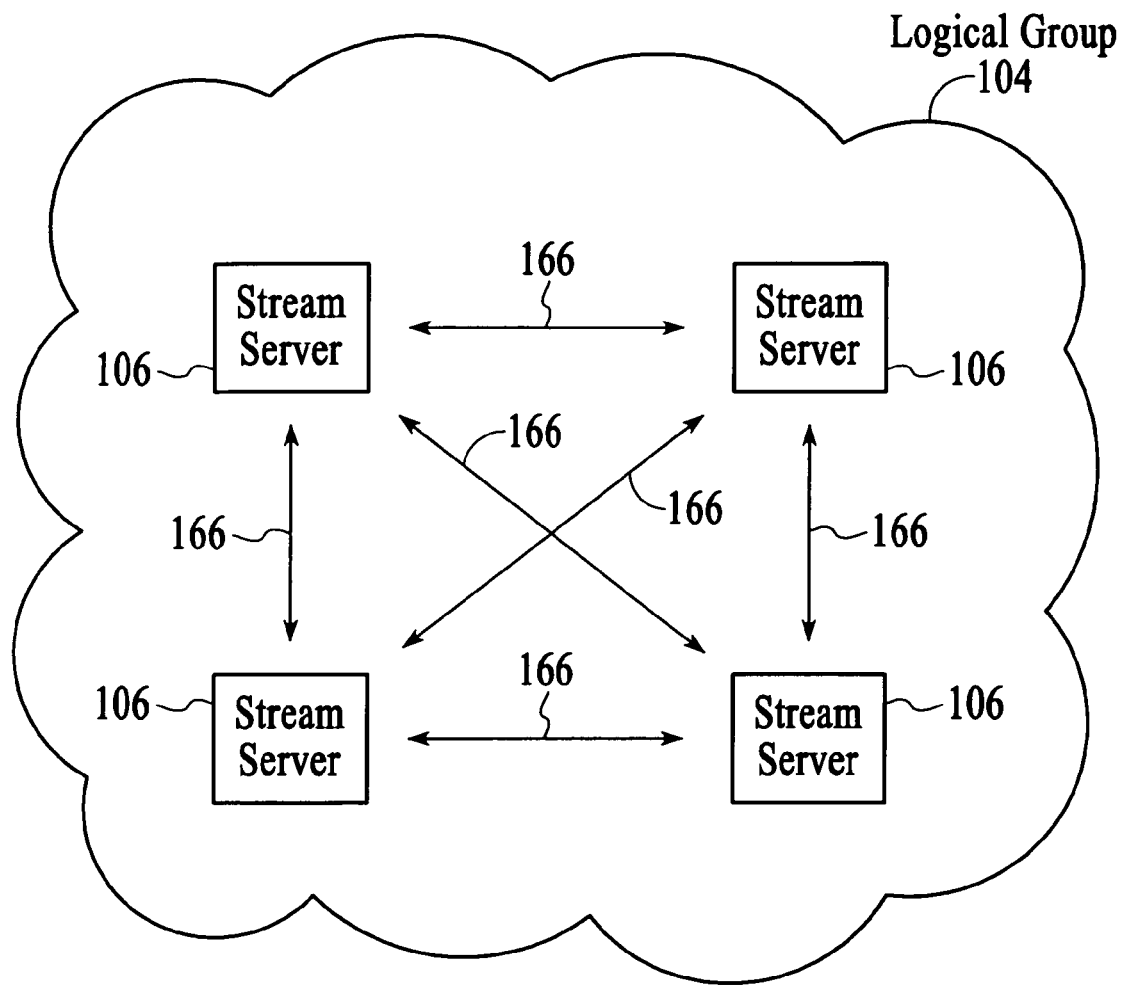
FIG. 9 illustrates the sharing of state information amongst stream servers in the logical group of stream servers.

FIG. 9 illustrates the sharing of state information 166 amongst stream servers 106 in the logical group 104 of stream servers. In the embodiment of FIG. 9, each of the stream servers supports active streams and generates state information related to the active streams. That is, none of the stream servers is dedicated solely to a backup function. Various techniques can be used to share state information amongst the stream servers in the logical group. In one embodiment, state information is copied from a state machine and distributed to the other stream servers in the logical group. In another embodiment, stream servers maintain dedicated state machines for the other stream servers and the stream servers share information that is input to the state machines (referred to herein as state machine inputs). The state machine inputs are then provided to the respective state machines that are maintained for the different stream servers. In an embodiment, in order to ensure quick and accurate switching of streams between stream servers in the logical group, state information is shared between the stream servers in real-time. State information can be shared amongst the stream servers in the stream group using, for example, a unicast flooding protocol.

Figure 10:
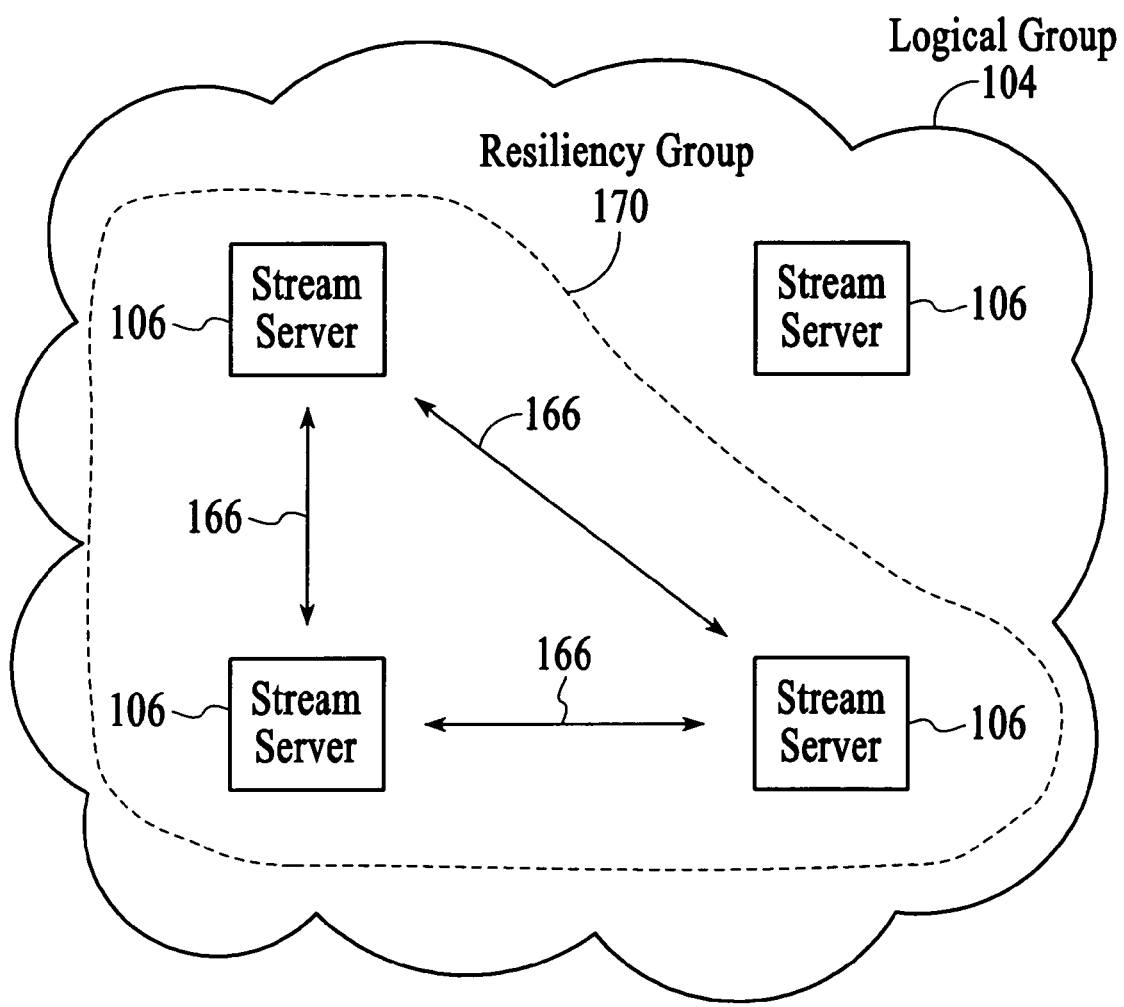
FIG. 10 illustrates a resiliency group that is established among a subset of the stream servers that make up the logical group.

In an embodiment, a resiliency group is logically established as a subset of the logical group of stream servers and state information is shared within the resiliency group instead of within the entire logical group. FIG. 10 illustrates a resiliency group 170 that is established among a subset of the stream servers 106 that make up the logical group 104. FIG. 10 also illustrates the sharing of state information 166 between the stream servers in the resiliency group. The use of a resiliency group allows the sharing of state information to be more limited. This allows certain stream servers in the logical group to be responsible for the failover control and limits the volume of state information messaging within the logical group.

Figure 11:
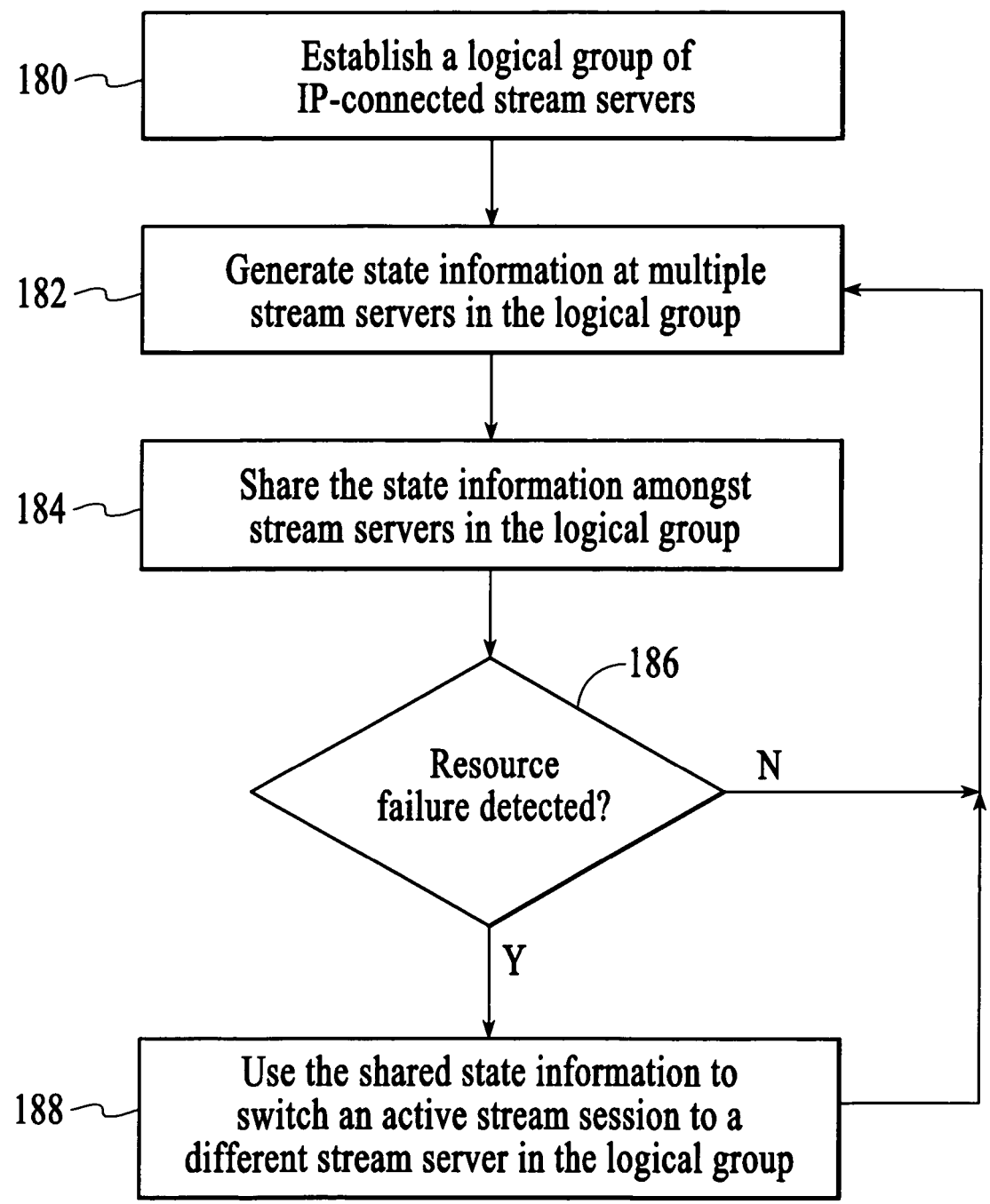
FIG. 11 is a process flow diagram of a method for managing the streaming of digital video content to multiple clients.

A technique for managing the streaming of digital video content to multiple clients is described with reference to FIG. 11. At block 180, a logical group of IP-connected stream servers is established. At block 182, state information is generated at multiple stream servers in the logical group. At block 184, state information is shared amongst stream servers in the logical group. At decision point 186, it is determined whether or not a resource failure has been detected. If no resource failure has been detected, the process returns to block 182, where state information continues to be generated by the stream servers in the logical group. On the other hand, if a resource failure is detected, at block 188, the state information is used to switch an active stream to a different stream server in the logical group. After switching the active stream to a different stream server in the logical group, the process returns to block 182, where state information continues to be generated by the stream server in the logical group.

In addition to using the state information for failure protection, the shared state information can be used to manage resources within the logical group 104, including, for example, assigning streams to stream servers 106 in the logical group, servicing stream requests, and load balancing.

Referring back to FIG. 7, the state management module 156 is responsible for managing the generation of state information, the sharing of state information amongst stream servers 106 in the logical group 104, and the using of the shared state information to respond to resource failures within the logical group.

As used herein, the terms "multicast" and "multicasting" refer to a technique for providing the same digital video content to multiple clients in which the digital video content is delivered over common links only once (e.g., the digital video content is copied when it reaches nodes with links to multiple destinations). As used herein, multicast and multicasting are synonymous with the terms broadcast and broadcasting as related to, for example, hybrid fiber coaxial (HFC) cable networks. As used herein, the terms "unicast" and "unicasting" refer to a technique for providing digital video content to a single specified client.

In some applications, the distribution network includes a packet-based network. In packet-based networks, multicasting may involve replicating packets at nodes that include multiple branches leading to different clients. The replication of packets at branching nodes eliminates the need to send multiple packets of the same content over the same link. Packet-based distribution networks may utilize, for example, IP, Ethernet, ATM, or a combination thereof to communicate digital video content. In packet-based networks, unicasting typically involves point-to-point messaging between nodes (e.g., servers and clients). Point-to-point messaging can be accomplished, for example, using well-known source/destination address based protocols (e.g., IP or Ethernet).

In some applications, the distribution network includes an HFC network that utilizes radio frequency signals (RF) for local distribution of digital video content to the clients. In HFC networks, multicasting typically involves distributing all channels to all clients. Each client is able to receive any channel by tuning to the desired channel. In HFC networks, unicasting may involve distributing a channel, which is intended for only one client, to multiple clients and coordinating with the intended client so that only the intended client is able to receive to the desired channel. Even though the channel may be distributed to multiple clients, only one client, the intended client, is able to access the channel and display the digital video content. For purposes of this description, a communications technique such as this, which can be implemented in HFC networks, is considered unicasting.

As is known in the field, the streams servers depicted in FIGS. 1 and 7 include a processor and memory. The processor may include a multifunction processor and/or an application specific processor that is operationally connected to the memory. The processor performs functions, such as executing software code, which are well-known in the field. The memory within the channel change server and the client may include circuits for storing processor-executable instructions, for buffering digital video content, and for storing data structures. Although the processor and memory are depicted as separate functional units, in some instances, the processor and memory are partially or fully integrated onto the same device. Processor-executable instructions generally include programs, protocols, data structures, routines, objects, and interfaces that can perform and/or enable certain useful functions. In an embodiment, the attribute engine, the protection mechanism selector, and the state management module are embodied as processor-executable instructions that are stored in memory that is resident on the stream servers.

The above-described techniques for provide stream control failover can be applied to any type of network that is able to stream digital video content to multiple clients.

Figure 12:
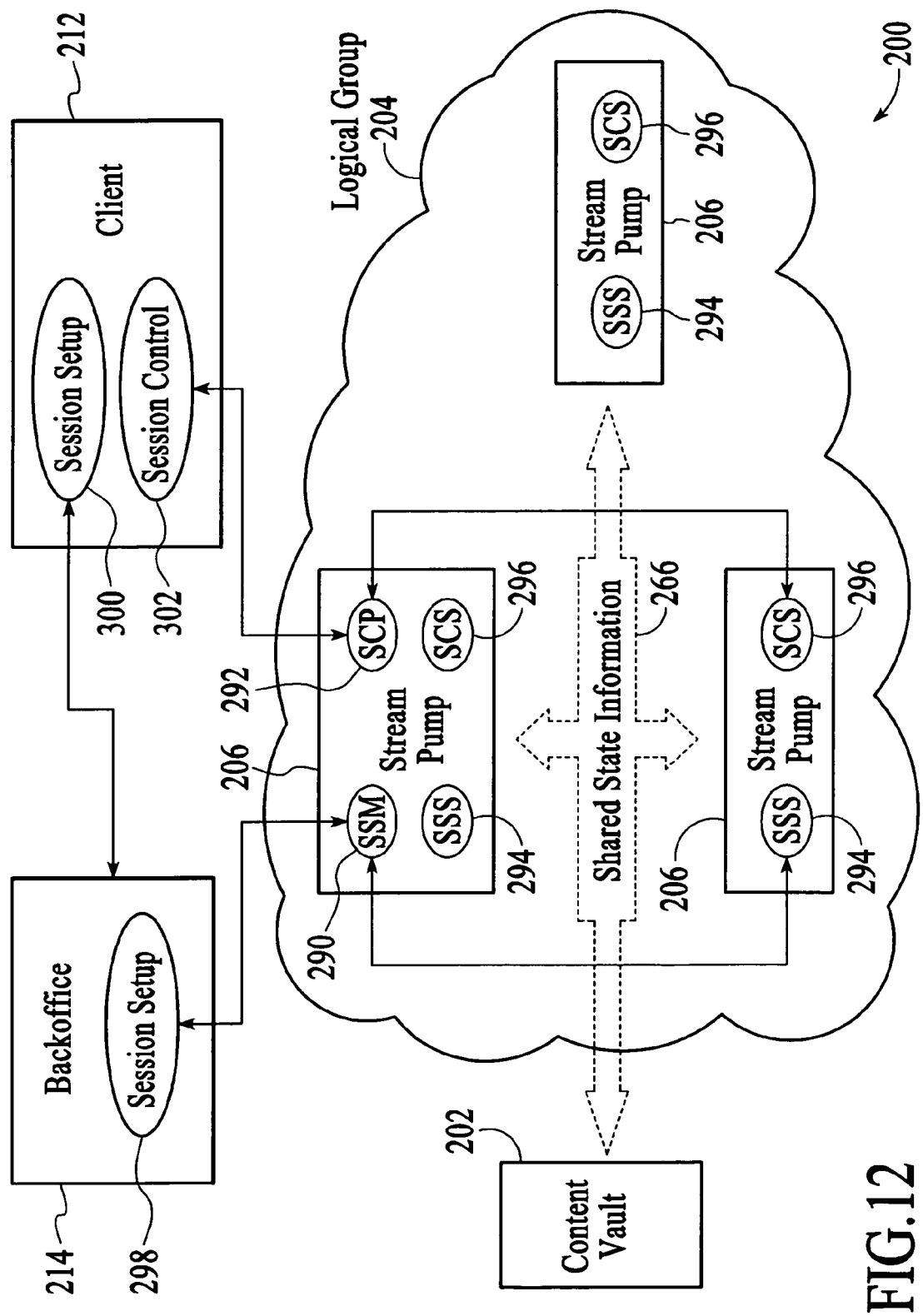
FIG. 12 depicts an embodiment of a streaming network architecture that supports stream control failover in accordance with an embodiment of the invention.

FIG. 12 depicts an embodiment of a network 200 that supports stream control failover in manner that provides continuous media streaming to a client with minimal or no delay and/or loss of frames. The network includes a content vault 202, a logical group 204 of stream pumps 206, a backoffice 214, and a client 212. Although only one client is depicted for description purposes, the network includes multiple clients as is known in the field of streaming networks. One of the stream pumps includes a stream service master (SSM) 290 and a stream control proxy 292, and each of the stream pumps includes a stream service slave (SSS) 294, and a stream control server (SCS) 296. The backoffice includes a session setup module 298 and the client includes session setup and session control modules 300 and 302, respectively. Functions of the above-identified elements are described below. The stream pumps may alternatively be referred to as stream servers and the content vaults may alternatively be referred to as vault servers. Further, the elements depicted in FIG. 12 are related to the corresponding elements described with reference to FIG. 1.

A. Terminology

SSM Stream Service Master

SCP Stream Control Proxy

SCS Stream Control Server

SSS Stream Service Slave

SCC Stream Control Client (e.g. settop box, STB)

Streaming Pump Streaming pump with cached real time stream (cached in RAM and optional disk)

Backoffice Client Control plane software for session setup and teardown

STB Client Software in device like STB for dynamic control of stream session

Failover-IP The IP address exported to external components such as Backoffice Control and Settop Box. One Failover-IP exists per pump group.

Internal-IP One or more unique IP addresses of each physical platform.

Topology Steering Redirecting a session from one streaming pump to another streaming pump based upon physical proximity of downstream networking resources. In cable networks for example, QAM service groups are assigned a routing affinity to streamers, and, in some configurations are constrained in downstream physical connectivity (i.e. unreachable by all but a subset of the streamers).

Resource Allocation Function performed by the SSM which evaluates information such as load balancing, actual cached contents per stream pump, and downstream topology affinity to choose the current best stream pump for handling this stream.

ESH External stream handle (ESH) is assigned by the streaming system and exposed to external signaling elements such as backoffice session manager and client session controller.

ISH Internal Stream handle (ISH) is assigned by the streaming system but retained internally only. The ISH and ESH have a 1-to-1 mapping for each and every stream.

Shared State Shared state information propagates in near real time between stream servers and vault servers or relevant subsets of the nodes.

Downstream Affinity Configured or discovered information as to the downstream connectivity for each streaming server.

Local Cache Each node in a logical stream server group has a local cache of streams. The streams may be located in RAM or in disk or fragments in both. All or a part of a stream may be in cache.

Callback Identifier An internal interface that allows one process or function to invoke another function, e.g. a callback function for handling stream session control operations (e.g. termination of stream).

Queued Play A method of organizing the stream playout from independent time segments of an existing stream.

Provisioned Multiple A method of organizing the stream playout by serially linking multiple independent streams together in time.

Trickle Down Mode A method of taking a streamer out of service by continuing to play active streams until they are terminated or transferred to other streaming services, while not initiating any new streams on the server.

GOID Global Object Identifier. Uniquely identifies an object in the cluster of servers. Multiple objects, each identified by their GOID, are configured for each stream.

The stream pumps 206 are organized into a fault tolerant logical group 204. Any method can be used by the group members to discover each other—static configuration, dynamic detection through the shared database.

B. Stream Pump Master

A heartbeat protocol is executed dynamically between the members of the stream pump logical group 204. One of the stream group members is elected as the master. Two functions are activated within the master.

1. Stream Service Master (SSM)

The SSM 290 is a process that is used to allocate all resources associated with a stream session in order to deliver the stream successfully to the client 212 (e.g. to a set top box). It uses load balancing information, cached contents per streamer, QAM steering, and downstream affinity to select the best suitable streamer within a logical stream server group. It also keeps track of all allocated and available resources for each individual stream server 206 within a logical stream server group.

2. Stream Control Proxy (SCP)

The SCP 292 forwards real time stream control commands (e.g. play, pause, resume, stop, fast-forward, rewind, and jump etc) to the appropriate stream server 206 within the logical group 204 even after the stream is handed over to another stream server in the case, for example, where the first stream server has its power completely turned off. The transition between stream servers is totally transparent, seamless, and glitchless to the stream control client (e.g. set top box) which is receiving and controlling its stream.

Each node in the stream group has two IP addresses. The failover IP address is an address that is assigned to at most one node within the group. The failover IP address is assigned to the stream server that includes the SSM/SCP functions. The failover IP address is visible to external clients, for example, both the session control client and the stream control client. The Internal IP address is the address of the node itself. It is not exposed to external clients.

When the heartbeat function detects that the master stream server has failed, a new stream service master is elected. The failover IP address is activated by the new master stream server. Active TCP connections will be broken and the clients will reestablish the TCP connection, but to the new master stream server. Sessions will continue uninterrupted.

After activating the failover IP address the master node listens for incoming TCP connection requests from session control and stream control clients (and any other client programs that can communicate with the streaming group). The master also starts both the SSM and SCP processes 290 and 292. The SSM and SCP processes discover all information about active streams, current load, etc from locally stored information and from the shared state information.

Stream Session Handles

In an embodiment, each active streaming session has two handles—the external stream handle (ESH) and the internal stream handle (ISH). When a stream is first created the ESH and ISH are identical. If the stream remains on the same stream server the handles continue to be equal. If the stream is moved to another stream server for any reason, the ESH stays the same for external clients, but the ISH is redefined to identify the stream on the new stream server. The SCP is responsible for mapping the ESH to the ISH for messages to and from external clients.

The streaming content-library and streaming system exposes the external resource-handle to external backoffice signaling control functions. Internally the system provides a dynamic proxy mapping function in order to deliver fault tolerance to external control functions. Three physical interfaces into the system—stream session setup (e.g. BMS), dynamic stream control (e.g. LSCP to STB), and content store control. In each interface, an external version of the resource handle (e.g. session_handle) is preserved, regardless of the location of the internal server. A proxy interfaces with the external control function. The proxy creates a mapping between the external resource-handle and the actual internal resource handle. The proxy and internal servers maintain a real time mapping between the two handles using an internal shared database distribution. From the perspective of the external control function, a single node address is presented (virtual IP address of the proxy) and a single resource handle is provided (mapped by the proxy to an internal handle).

C. Stream Service Slave Nodes

In an embodiment, all nodes in the logical group 204, both the master node and the slave nodes, have two processes that are always active. Both processes create connections to the stream service master using their internal IP address. They register themselves to the SSM 290 and SCP 292 when they bring up the connection. This also allows the SSM and SCP to initiate the connection using information gleaned from the shared state information 266 and other locally stored information.

1. Stream Service Slave (SSS)

The SSS handles allocation of resources for the stream as requested by the SSM.

2. Stream Control Server (SCS)

The SCS handles all dynamic stream control commands that are forwarded to it by the SCP 292. As part of allocating the resources for a stream, the SSM 290 locates one of the SSS 294 based on the criteria which can serve that stream the best. The SSM then allocates the stream to that stream server and sends the stream initiation request to the SSS within that stream server. The SSS shares the stream handles, and memory to communicate with caching systems. Every time the SSS comes up, it synchronizes with its local caching system and becomes aware of all local streams contained within the local caching system.

The SCS 296 receives stream control commands from the SCP 292. The SCP opens a new connection to the SCS for each client connection it has. The SCP checks the encoded stream handle and finds out where the control command has to go. Once the SCS gets the commands from the proxy, it validates the stream handle and passes it to the local caching system with a callback (or equivalent internal linkage) for it to take the action for the stream associated with the handle.

The SCS 296 keeps track of the states of each stream and each call back identifier it has passed to the local caching system. The local caching system calls the SCS back after the stream is over, erred, switched to the next queued play command, switched to the next content in case of provision multiple, and initiation of playing of live streams.

The SCS sends back a proper response to the SCP after processing the control commands it gets from the SCP. After receiving the response, the SCP then forwards the response to the correct external client.

There are some asynchronous responses from the local caching system (e.g. the stream is over) which are also sent to the client. These asynchronous responses are also received by the SCS, sent to the SCP, and then forwarded to the correct external client.

D. Stream Handover Method

A stream can be handed over from one stream server to another stream server based on any of several criteria: load balancing, server crash, or power failure.

In a stream server that has the handed over stream, the local caching system passes all information about the stream to the SCS through the callback function. The original stream handle, the stream handle associated with stream initially called as external stream handle, and the new internal stream handle which is being used by the new stream server is communicated to the SCS through the callback mechanism. The SCS then delivers this information to the SSS, SSM, and SCP to seamlessly handle the all inbound actions for that stream.

E. Additional Features

In addition to the basic feature of fault tolerance there are additional enhanced features that strengthen the resiliency and scalability of the mechanism.

1. Trickle Down Out of Service Mode

A load balancing protocol for allocating new streams on a specific stream server in a logical group can be configured to help the SSM to trickle down any stream server in the logical group. The trickle down process enables the SSM not to allocate any new streams to the stream server which has been trickled down, but the old streams still keep going. In this way, the stream servers could have zero down time for system upgrade.

2. Topology Steering

There are situations in which the actual downstream topology is difficult if not impossible to compute until later in the stream session setup phase. There are also fault tolerance situations in which a downstream network resource is taken out of service or fails. In either of these cases, a stream may need to be moved to a different stream server. This feature is called Topology Steering (or QAM steering for Cable). The failover mechanisms described herein are used to assure a seamless transfer of the stream from one stream server to another stream server with better topological affinity.

In an embodiment, topology steering is invoked based upon load. If a stream server is congested, a second tier stream server, one in the same logical group or one further upstream in a regional node, is assigned to play out the stream.

3. Real-Time Communication of Vault Properties

An important attribute that is consulted as part of the algorithm to decide whether or not to retain and reuse cached content is the set of properties for the content stream. This attribute boosts the performance of allocating streams on each stream server. The ingestion function of the content vault dynamically tracks these properties and dynamically communicates changes in properties to all stream servers using the shared state information. Attributes of an individual vault content stream may include, for example, content-added, content-deleted, and content-changed.

4. Popularity Attribute Computation

The servers dynamically compute popularity of content based upon actual demand. The popularity rating may be computed locally or may be communicated to other servers and computed globally. In an embodiment, the servers use the popularity information to prioritize requests to delete content in order to free up cache space.

The popularity of content can influence the choice of resiliency algorithm ranging from hot standby to cold standby to ensure the quickest and most seamless failover mechanism for the most popular content elements.

5. Hot Standby Streaming

For a certain set of streams that have been declared high priority and popular, a mechanism is defined which allows the streams to be transferred to another stream server without losing a frame. The stream is cached and played out into RAM on a mirroring stream server. But the mirroring server does not transmit the stream over its network interfaces. When the failover is detected the stream is played out from RAM, and the client sees no degradation at all.

6. Load Distribution Resiliency

A stream consists of multiple objects, each identified by its global object identifier (GOID). A stream (can also be called a "title" or "content") consists of the normal play object, its trick mode objects, and an igate object that contains metadata information (like where the I-frames are) for the content. In addition there can be a delta file that tracks changes that have been made to the normal play object so that it is possible to recreate the original content for ftp out (where the system acts as a content server for other VOD servers).

Two variables measuring "business" or load are defined. One is the amount of a GOID stored on the local disk and the other is a busy level for the local CPU resources. These "busy" (CPU load and bandwidth) measures can to be made relative either by including max capability in the cost or exporting relative cost in these dimensions so decisions can be made across systems of varying capability.

Two parameters are defined to enhance resiliency for the load distribution function. The first is a basic threshold to decide whether a stream has enough usage to worry about resiliency. For maximum resiliency this threshold is set to zero. For less resilient configurations it can be set higher. A typical setting would be so only streams which had been used over 10's to 100's of times would be distributed for resiliency. The other parameter is a limit on the dynamic range of load on a given GOID across stream group members. This is important to increase the probability of being able to failover into the RAM cache. A default value is such that the ratio of minimum load to maximum load between stream server in a logical group is the size of the logical group. That is if the group size is four then the ratio of minimum load to maximum load on a particular GOID is not allowed to exceed four. This combined with the locality measurements forces load on a particular GOID to be distributed about a logical group in "clumps". The limit on dynamic range stream group member would already have load on all popular titles so failover would be less difficult. This allows for both reasonable cache efficiency and quick recovery from failure.

One factor affecting the programmed delay introduced into stream playout has to do with latency needs of the client. If resumption of the stream will be delayed due the need for local or remote disk access in the client, an appropriate delay will be introduced, and the stream will be padded with fake frames by the stream server. Once the stream is resumed at the client a second delay parameter is the delay at which a splice is introduced rather than a simple resumption of the stream.

7. Optimizing Speed, Distribution, and Load Balancing

The three key variables governing stream recovery algorithm are stream recovery speed, stream recovery distribution, and stream load balancing. Methods for failure recovery range from "hot-standby" (where a stream is playing to RAM but not being transmitted to the network interface) where twice the bandwidth is consumed so that recovery from a fault is as quick as possible to "frozen-standby" where speed is sacrificed over ongoing bandwidth consumption. The goal is to choose the "coldest" standby model that sufficiently addresses a streaming client recovery speed requirement as it will greatly reduce the resource requirement.

Recovery distribution deals with which server is responsible for maintaining the recovery data and instantiating the recovery process. Two methods are usable for resiliency enforcement—resiliency partner (one to one—or assigning responsibility to one other machine) and resiliency group (one to many—or distributing responsibility across several other machines). Although there is little difference in resource consumption, a resiliency group offers slightly quicker recovery (since several machines are recovering from the loss of both active and "standby" streams in parallel) as well as some level of recovery should more than one failure be experienced (since all recovery data is not in one machine).

Finally, load balancing deals with distributing active streams across a stream group in a fashion that attempts to balance overall system load with cache effectiveness. The load balancer must not only deal with where to host a new stream, but it must also deal with changes, both planned and unplanned, in system resources. In a "hot-standby" model a "standby" stream consumes just as many resources as an active stream and therefore must be actively load balanced from the beginning. As the recovery speed is pushed more toward the "frozen-standby" model, the requirement to actively load balance "standby" streams diminishes.

In an implementation of stream resiliency, the system offers multiple stream resiliency options which allow the system administrator to balance recovery speed and hardware consumption.

8. Load Balancing and Stream Handoff in Trick Mode

In addition to the core load balancing and stream handoff algorithms for the stream itself, additional mechanisms are defined for the trick modes (e.g., rewind, fast rewind, pause, fast forward) associated with the streams. When a trick mode is invoked, the dynamic load balancing and resiliency mechanisms of this invention will be applied to the trick mode stream. When trick mode is not invoked, the load balancing and resiliency mechanisms will not be applied to the trick mode stream. As a result of this enhancement, cache efficiency is significantly enhanced because trick mode streams are pulled into a fewer number of stream servers, resulting in higher reuse rates.

9. Stream Handoff Based on Configuration Change

In addition to the stream handoff algorithms being invoked based upon failure of a member of a stream or vault group, they can also be invoked based upon a configuration change. In one case the configuration change occurs because of an explicit operator action. In another case the configuration change occurs based upon device failure. In either case, the same algorithms are used to handoff streams in a fault tolerant fashion.

10. Proxy Content Vault Handle Management

In addition the maintenance of separate internal and external handles for a logical stream group, a vault server can also implement the same mechanism to hide the internal architecture from external entities, and to enable transparent fault tolerance. A handle that is exposed to a backoffice client of the vault server is remapped to an internal handle if failover occurs and the content is moved to a different vault. In addition the mechanism of using heartbeats for keepalive detection, and election of masters within a vault group, is also implementable within a vault group.

F. Server Resiliency Protocol

1. Server Resiliency Group Composition

The purpose of a server resiliency group is to preserve state of group members so that if one member fails another member can take responsibility of redirecting the load from the failed member.

A server resiliency group is composed of two or more servers which have entities of the same type. That is, a stream server will be in a resiliency group with stream servers. A server with both a stream server and vault server functionality can be members of two resiliency groups.

2. Server Resiliency Protocol

According to the server resiliency protocol, the payload of packets is encoded in self describing units. Each unit contains a length, an operation code and operation data. A packet contains at least one unit and units are not split across packet boundaries. When a packet fills, it is sent. Otherwise it is timed to make sure it waits no longer than a set period (e.g., 1-5 ms locally—a metro level timer may be longer). This timer influences; 1) the delay in determining that a server has failed, and 2) the recovery time. Units are added on an event basis.

3. Operations

Operations may be one of three types:
Request (.req)—These operations request response information.
Response (.rsp)—These operations respond to a previous request.
Announcement (.ann)—These operations announce state information.

4. Header

The protocol header contains 1) a Sequence Number, 64 bit unsigned and assumed to never wrap; and 2) Time—64 bit unsigned—assumed to never wrap—in 100 microsecond ticks—estimate of transmit time. This estimate may need to account for queued data on adapter unless there is very low transmit jitter. This time is used by recipients (remember this is multicast) to develop a model of transmitter jitter. The jitter model is used to determine timers for detecting server failure and packet loss.

Operation Name: Enter.ann
Function: Announce a new member of the resiliency group is entering (the source MAC)
Parameters: None
Action: Upon receipt any previous state about the source MAC is discarded (e.g. sequence number) and the source is added to the local list of group members.
Operation Name: Rename.ann
Function: Announce a new member of the resiliency group is entering (the source MAC)
Parameters: Member—MAC address previously used by group member
Action: Upon receipt any previous state about the source MAC replaces Member in the local list of members. All additional state information is left unchanged. When a port fails this is used to switch to another port and obviously would be the first unit in the first packet sent after the change.
Operation Name: Leave.ann
Function: Announce a member of the resiliency group is leaving (the source MAC)
Parameters: None
Action: Upon receipt any previous state about the source MAC is discarded (e.g. sequence number) and the source is deleted from the local list of group members.
Operation Name: Retransmit.ann
Function: Request the retransmission of apparently dropped packet(s)
Parameters: Member—MAC address of member
Dropped—16 bit unsigned—Count of sequence numbers to retransmit
Sequence—Array of 64 bit unsigned—Sequence numbers to retransmit
Action: If Member is a local MAC address then the request packet(s) should be retransmitted.
Operation Name: Receive.ann
Function: Announce the reception of all packets up to the specified sequence number
Parameters: Member—MAC address—MAC address of member
Sequence—64 bit unsigned—Sequence number of last packet received in order
Action: If Member is a local MAC address then the all packets up to Sequence are acknowledged by the source MAC address. Once acknowledged by all group members the transmit buffers may be reused.
Operation Name: State.ann
Function: Announce state from the member
Parameters: Entity ID—16 bit unsigned—ID for source entity
Type ID—16 bit unsigned—ID of state type for entity
Length—16 bit unsigned—Length in bytes of state
State Data—byte array with length specified by Length—the state data
Action: Upon reception the state resiliency handler for the entity referenced by the entity ID is call with the Type ID, Length and State Data. The semantics of the type is left up to the entity. The State Data is opaque except to the state resiliency handler.

G. Streaming Resiliency

1. Stream State Resiliency

In an embodiment, stream state is preserved across stream server fault. This is done through two logging mechanisms; 1) logging to resiliency group, and 2) logging to disk. The state logged is the same regardless of whether it is logged to a resiliency group or to disk. A streamer will log updates to its state to both locations. The other members of the resiliency group maintain a "shadow" server state which can be used when a stream server failure is detected to handoff the impacted streams to other stream servers. Potentially the other resiliency group members can also log this "shadow" state to provide another level of resiliency.

2. Logging to Disk

In one class of solutions a fairly full function database can be used to update and log stream server state. In another preferred class of solutions a lower level of functionality can be used to achieve higher performance. Some nodes have a relatively modest number of streams per device measured in thousands with a definite maximum. The most common stream state changes (rewind, fast forward, pause) are non-critical individual transactions and have a built-in retry from the human holding the IR remote.

In an embodiment, no database is used and instead a flat file is created which is simply a copy of the memory image. When the full state is written out to disk, it is merely copied in memory and then written with a lock being held on the actual data structures only during the memory-to-memory copy.

The model is that the streams persist forever. They are updated, marked active, valid, etc. and those transactions are logged. The most common transactions should be very short log entries (for example, 32 bytes or less) so that the total amount of disk I/O is relatively low. A short timer is used to force out the log on a periodic basis, e.g. every 100 ms. The full state is written opportunistically but should be written at least every minute or so to reduce log file size.

Every entry in the log contains an integrity vector (for example, use a 64 bit XOR of the entry) and a guaranteed monotonic transaction ID (pretend the log went on "forever" and use the 64 bit integer byte offset of the log entry in the "virtual log file" as the transaction ID—this makes the transaction ID dependent on the sequence of log entries over all time and creates an easy unique validation independent of the integrity vector). Each stream entry in the full state write to disk contains the Transaction ID of the last logged update and an integrity vector for the stream entry including the Transaction ID.

The file level serialization is that a log file cannot be deleted until the full stream state has been successfully written out incorporates all of changes from the log file.

In order for the full stream state to be disk controller resilient the state file and log files are written in redundant locations to survive a controller failure.

To recover the stream state, one would read the latest state file and verify the integrity vector of each entry. Then one would read the log files and apply the changes if and only the Transaction ID of the log entry was greater than the Transaction ID in the data structure. If a validation check fails the other copy of the file is used. With every entry having multiple ways to validate the robustness of this recovery can be quite great.

Any needed indices would then be built (e.g. just a hash or two) and the system is ready to be activated. A possible optimization is to store the stream entries as a local cache to reduce remote lookup of information when starting another copy of the same content (this creates the need for a stream state "valid" while the stream is not active but being retained as cached state).

3. LSCP Connection State Resiliency

It is possible if the STB code is robust enough that LSCP state could be preserved across stream server faults very easily, however, this would become a requirement for every client on every STB. In an embodiment, the stream server responds to ARP's for the stream control IP address with either a multicast previously registered via GMRP with the local switch or a unicast which been configured to a VLAN containing all members of a stream group but has not been resolved to a port. This approach assumes all stream group members are reachable via layer 2 addressing.

Once done, this will imply all stream servers will see all control traffic.

At this point a new layer is added between the MAC and the TCP stack—which is called NAT (Video Network Address Translation). The VNAT has the classical NAT functions of address translation and sequence number translation, etc. It does not have to do some of the more painful NAT functions such as finding and translating embedded addressed. However, it does have multiple responsibilities beyond a regular NAT. It must be able to: Decide whether inbound are actually destined for this streamer or not:

1. Spoof TCP connection setup and tear down
2. Maintain distributed state for retransmissions across a streamer failure
3. Handle retransmissions if needed In an embodiment, state information includes state information related to a particular stream or streams. For example, state information related to a stream may include a stream descriptor, stream identifier, a time offset (for example a time offset from real-time relative to other streams carrying the same digital video content and or a time offset relative to the ingest time of the digital video content), and a destination IP and or MAC address for the stream. A time offset for a stream can occur as the result of initiating a trick mode (e.g., rewind, fast rewind, pause, fast forward).

Although specific embodiments of the invention have been described and illustrated, the invention is not to be limited to the specific forms or arrangements of parts as described and illustrated herein. The invention is limited only by the claims.

What is claimed is:

1. A method for managing the streaming of digital video content to multiple clients, the method comprising:
    establishing a logical group of IP-connected stream servers, wherein the logical group is established by associating each stream server in the logical group with the same group identifier and wherein each stream server in the logical group has an internal IP address that is not exposed to the clients;
    establishing one of the stream servers in the logical group as having responsibility for managing session setup, the stream server being referred to herein as the stream service master;
    creating connections to the stream service master using the internal IP addresses of the stream servers in the logical group;
    assigning a failover IP address to the stream service master, wherein the failover IP address is visible to the clients;
    generating state information at multiple stream servers within the logical group;
    sharing state information amongst stream servers in the logical group;
    detecting a failure of the stream service master;
    activating the failover IP address in one of the other stream servers in the logical group in response to the detected failure, wherein the stream server in which the failover IP address is activated becomes the new stream service master; and
    at the new master stream service master, using the shared state information to discover information about active streams in the logical group;
    wherein the above-identified steps are performed using at least one processor.

2. The method of claim 1 wherein activating the failover IP address causes active TCP connections between the stream service master and the clients to be broken and the stream sessions to continue uninterrupted and wherein TCP connections are reestablished with the new stream service master.

3. The method of claim 1 wherein sharing state information amongst the stream servers in a resiliency group comprises maintaining dedicated state machines for the other stream servers in the logical group.

4. The method of claim 1 further comprising establishing a resiliency group from among the stream servers in the logical group, the resiliency group being a subset of the stream servers in the logical group.

5. The method of claim 4 wherein the state information is shared only amongst the stream servers in the resiliency group.

6. The method of claim 1 wherein the stream state information is shared amongst the stream servers in real time.

7. The method of claim 1 further comprising using the shared state information to manage stream server resources.

8. The method of claim 1 further comprising using the shared state information to assign new streams to the stream servers in the logical group.

9. The method of claim 1 further comprising using the shared state information to service stream requests.

10. The method of claim 1 further comprising using the shared state information in load balancing streams amongst the stream servers in the logical group.

11. The method of claim 1 further comprising:
   identifying an attribute of a content element that is streamed to a client; and selecting a protection mechanism for the content element as a function of the attribute, wherein the protection mechanism enables streaming of the content element to the client in the event of a resource failure.

\* \* \* \* \*